United States Patent
Jang et al.

(10) Patent No.: US 9,453,945 B2
(45) Date of Patent: Sep. 27, 2016

(54) FRESNEL LENS AND PYROELECTRICITY SENSOR MODULE INCLUDING THE SAME

(71) Applicant: SAMSUNG ELECTRONICS CO., LTD., Suwon-si (KR)

(72) Inventors: Young-ick Jang, Seoul (KR); Byung-seok Soh, Yongin-si (KR); Sang-on Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 249 days.

(21) Appl. No.: 14/137,166

(22) Filed: Dec. 20, 2013

(65) Prior Publication Data
US 2014/0191129 A1    Jul. 10, 2014

Related U.S. Application Data

(60) Provisional application No. 61/748,917, filed on Jan. 4, 2013.

(30) Foreign Application Priority Data

Jul. 10, 2013    (KR) .................. 10-2013-0080917

(51) Int. Cl.
*G02B 3/08* (2006.01)
*G01J 5/00* (2006.01)
(Continued)

(52) U.S. Cl.
CPC .............. *G02B 3/08* (2013.01); *G01J 5/0022* (2013.01); *G01J 5/0806* (2013.01); *G01J 5/34* (2013.01); *G02B 19/009* (2013.01); *G02B 19/0076* (2013.01); *G08B 13/193* (2013.01)

(58) Field of Classification Search
CPC ...... G02B 3/08; G02B 27/0025; G02B 3/00; G02B 3/0087; G02B 5/126; G02B 9/12; G02B 5/1876; G02B 19/0076; G02B 19/009; G01J 5/10

USPC .............. 250/338.3; 359/742, 642, 741, 784, 359/542, 652, 737
See application file for complete search history.

(56) References Cited

U.S. PATENT DOCUMENTS 4,442,359 A * 4/1984 Lederer ................ G08B 13/193
250/342
4,707,604 A * 11/1987 Guscott ................ G08B 13/193
250/342

(Continued)

FOREIGN PATENT DOCUMENTS

JP    63-277938 A    11/1988
JP    05-322649 A    12/1993
(Continued)

OTHER PUBLICATIONS

Communication from the European Patent Office issued May 13, 2014 in a counterpart European Application No. 13198225.8.

*Primary Examiner* — David Porta
*Assistant Examiner* — Djura Malevic
(74) *Attorney, Agent, or Firm* — Sughrue Mion, PLLC (57) ABSTRACT

A Fresnel lens and a pyroelectricity sensor module are provided. The Fresnel lens includes unit lens groups having different refractive indexes, and each of the unit lens groups includes unit lenses. Between two unit lenses of the same unit lens group at least one unit lens included in a different lens group is arranged. The pyroelectricity sensor module includes a Fresnel lens which condenses infrared light; a detecting sensor disposed to receive the condensed infrared light and detect the infrared light; and a signal processing board on which the detecting sensor is mounted and configured to control an output signal of the detecting sensor. The Fresnel lens includes unit lens groups having different refractive indexes, and each of the unit lens groups includes unit lenses, and between two unit lenses of the same unit lens group, at least one unit lens included in a different lens group is arranged.

20 Claims, 7 Drawing Sheets

(51) Int. Cl.
  *G01J 5/08* (2006.01)
  *G02B 19/00* (2006.01)
  *G01J 5/34* (2006.01)
  *G08B 13/193* (2006.01)

(56) References Cited

U.S. PATENT DOCUMENTS

| | | | | |
|---|---|---|---|---|
| 4,757,204 A * | 7/1988 | Baldwin | ............ | G08B 13/193 250/342 |
| 4,787,722 A * | 11/1988 | Claytor | ............ | G02B 3/08 359/708 |
| 4,873,469 A * | 10/1989 | Young | ............ | F21V 23/0442 250/221 |
| 4,930,864 A * | 6/1990 | Kuster | ............ | G02B 13/14 250/221 |
| 4,990,783 A * | 2/1991 | Muller | ............ | G08B 13/193 250/342 |
| 5,017,783 A * | 5/1991 | Mousavi | ............ | G01J 5/0022 250/342 |
| 5,138,495 A * | 8/1992 | Shiono | ............ | G02B 5/1876 250/201.6 |
| 5,311,024 A * | 5/1994 | Marman | ............ | G08B 13/193 250/342 |
| 5,712,622 A * | 1/1998 | Grossinger | ............ | G08B 13/193 340/555 |
| 5,982,543 A * | 11/1999 | Fiala | ............ | G02B 5/1895 351/159.01 |
| 6,292,295 B1 * | 9/2001 | Yamashita | ............ | G03B 21/625 359/460 |
| 6,324,008 B1 * | 11/2001 | Baldwin | ............ | G01K 1/16 250/353 |
| 7,250,605 B2 * | 7/2007 | Zhevelev | ............ | G01J 5/08 250/353 |
| 7,459,672 B2 * | 12/2008 | Jensen | ............ | G08B 13/193 250/221 |
| 7,460,301 B2 * | 12/2008 | Imafuku | ............ | G03B 21/10 348/E5.137 |
| 7,740,354 B2 * | 6/2010 | Volk | ............ | G02C 7/061 351/159.42 |
| 7,875,853 B2 * | 1/2011 | Edwards | ............ | G08B 13/193 250/338.1 |
| 8,042,975 B2 * | 10/2011 | Shyu | ............ | G02B 3/08 359/742 |
| 8,317,321 B2 * | 11/2012 | Haddock | ............ | G02B 5/1895 351/159.01 |
| 8,872,091 B2 * | 10/2014 | Saitou | ............ | G02B 3/0043 250/208.1 |
| 9,000,378 B2 * | 4/2015 | Oi | ............ | G01J 1/0266 250/353 |
| 2003/0058532 A1 * | 3/2003 | Suzuki | ............ | G02B 3/08 359/455 |
| 2009/0261237 A1 * | 10/2009 | Backes | ............ | B60S 1/0837 250/227.11 |
| 2013/0050851 A1 * | 2/2013 | Machida | ............ | B29D 11/00269 359/742 |
| 2013/0126739 A1 * | 5/2013 | Oi | ............ | G01J 1/0266 250/353 |
| 2013/0235479 A1 * | 9/2013 | Oi | ............ | G02B 3/08 359/742 |

FOREIGN PATENT DOCUMENTS

| | | |
|---|---|---|
| JP | 10-142351 A | 5/1998 |
| JP | 2012-173555 A | 9/2012 |

* cited by examiner

FRESNEL LENS AND PYROELECTRICITY SENSOR MODULE INCLUDING THE SAME

CROSS-REFERENCE TO RELATED APPLICATIONS

This application claims priority from U.S. Provisional Patent Application No. 61/748,917, filed on Jan. 4, 2013 in the United States Patent and Trademark Office, and Korean Patent Application No. 10-2013-0080917, filed on Jul. 10, 2013 in the Korean Intellectual Property Office, the disclosures of which are incorporated by reference herein in their entireties.

BACKGROUND

1. Field

Apparatuses, devices, and articles of manufacture consistent with exemplary embodiments relate to a Fresnel lens and a pyroelectricity sensor module including the same.

2. Description of the Related Art

Pyroelectric infrared ray (PR) sensors are employed to detect human motion through detection of a change of infrared rays and are widely used in security fields, electric fields, home automation fields, or other industrial fields. The PR sensor is a pyroelectric device sensor configured to react to an infrared ray having a wavelength of about 10 μm emitted from a human body, and in general, the PIR sensor constitutes a pyroelectricity sensor module together with a signal processing board configured to control an output signal of the PIR sensor, and a condenser configured to concentrate light to the PIR sensor.

The PIR sensor typically uses a Fresnel lens as a condenser. The Fresnel lens is a lens configured of several ring-shaped lenses having a predetermined thickness to reduce a thickness of the lens. As the Fresnel lens, there are a single Fresnel lens having a single refractive index and a multi-Fresnel lens configured as a combination of stacked Fresnel lenses having different refractive indexes to secure a wider viewing angle. However, the multi-Fresnel lens suffers from a disadvantage in that a total size of a lens is increased in proportion to the number of stacked Fresnel lenses due to a space occupied by each of the Fresnel lenses. Accordingly, when the multi-Fresnel lens is applied as a condenser in the pyroelectricity sensor to secure a wider viewing angle, a size of the pyroelectricity sensor is also increased. This is not suitable for the recent trend of miniaturization of pyroelectricity sensors.

SUMMARY

One or more exemplary embodiments may overcome the above disadvantages and other disadvantages not described above. However, it is understood that one or more exemplary embodiment are not required to overcome the disadvantages described above, and may not overcome any of the disadvantages described above.

One or more exemplary embodiments provide a Fresnel lens having a plurality of refraction angles and capable of promoting miniaturization thereof, and a pyroelectricity sensor module including the same.

According to an aspect of an exemplary embodiment, there is provided a Fresnel lens including a plurality of unit lens groups having different refractive indexes, each of the plurality of unit lens groups including a plurality of unit lenses, wherein between two unit lenses of the same unit lens group, at least one unit lens included in a different lens group is arranged.

An arrangement of the plurality of unit lenses may be made through repetition of a sequential arrangement of the unit lenses having different refractive indexes.

An arrangement of the plurality of unit lenses may be made through an irregular arrangement of the unit lenses having different refractive indexes.

The plurality of unit lenses may extend along a radial direction.

Each of the unit lenses may include a body portion configured to form a light incident surface of the Fresnel lens, and a plurality of protrusion portions extending from the body portion and configured to form a light refracting surface of the Fresnel lens.

Each of the protrusion portions may include an extending portion vertically extending from the body portion, and an inclined portion obliquely extending from the extending portion and connected to the body portion.

Each of the unit lenses may be in contact along the radial direction with adjacent unit lenses.

The light incident surface may have a circular shape or a polygonal shape.

The plurality of unit lens groups may include a first unit lens group, a second unit lens group, a third unit lens group, and a fourth unit lens group.

The plurality of protrusion portions may include a first protrusion portion, a second protrusion portion, a third protrusion portion, a fourth protrusion portion, a fifth protrusion portion, and a sixth protrusion portion.

The first to sixth protrusion portions of the plurality of the unit lenses may form first to sixth light refraction portions of the Fresnel lens, respectively.

A width of the body portion may be gradually reduced from the circumference of the Fresnel lens toward the center of the Fresnel lens in the radial direction.

The width of the body portion at the circumference of the Fresnel lens may be at least 20 μm.

The plurality of unit lenses may be arranged along a circumferential direction of the Fresnel lens, and the at least one unit lens included in the different lens group may be arranged between the two unit lenses of the same unit lens group in the circumferential direction According to an aspect of another exemplary embodiment, there is provided a pyroelectricity sensor module including a Fresnel lens including a plurality of unit lenses, the Fresnel lens condensing infrared light; a detecting sensor disposed to receive the infrared light condensed by the Fresnel lens and configured to detect the infrared light; and a signal processing board on which the detecting sensor is mounted and configured to control an output signal of the detecting sensor, wherein the Fresnel lens includes a plurality of unit lens groups having different refractive indexes, and each of the plurality of unit lens groups includes a plurality of unit lenses, and wherein between two unit lenses of the same unit lens group, at least one unit lens included in a different lens group is arranged.

An arrangement of the plurality of unit lenses may be made through repetition of a sequential arrangement of the unit lenses having different refractive indexes.

An arrangement of the plurality of unit lenses may be made through an irregular arrangement of the unit lenses having different refractive indexes.

The signal processing board may amplify an output signal of the detecting sensor.

The detecting sensor may be a pyroelectric infrared ray (PIR) sensor.

The plurality of unit lenses may be arranged along a circumferential direction of the Fresnel lens, and the at least one unit lens included in the different lens group may be arranged between the two unit lenses of the same unit lens group in the circumferential direction

BRIEF DESCRIPTION OF THE DRAWINGS

The above and/or other aspects will be more apparent by describing in detail exemplary embodiments, with reference to the accompanying drawings, in which.

DETAILED DESCRIPTION OF EXEMPLARY EMBODIMENTS

Hereinafter, exemplary embodiments will be described in more detail with reference to the accompanying drawings.

In the following description, same reference numerals are used for the same elements when the same elements are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

Figure 1:
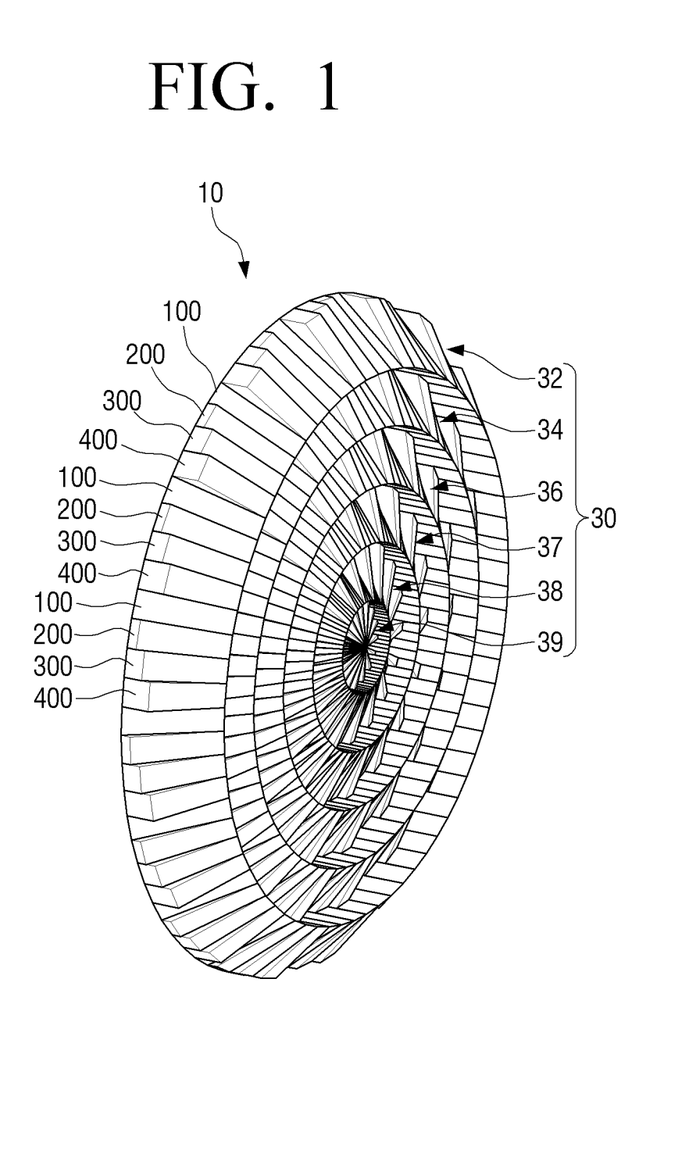
FIG. 1 is a perspective view illustrating a Fresnel lens according to an exemplary embodiment.
Figure 2:
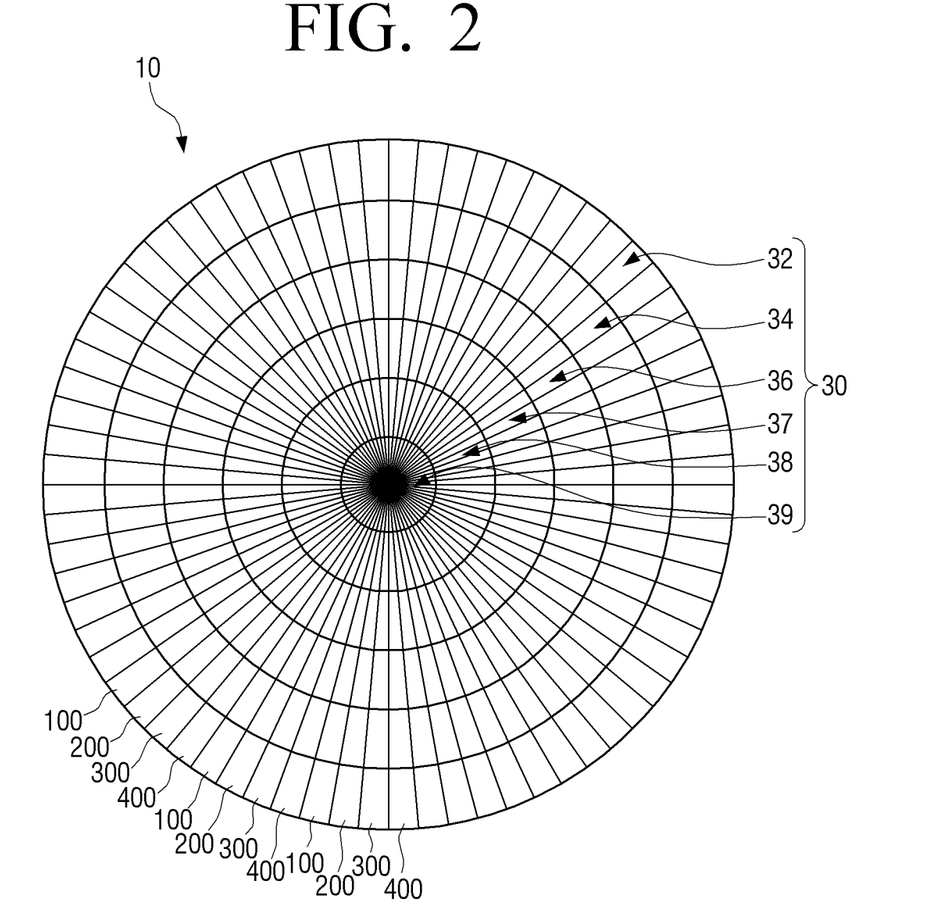
FIG. 2 is a plan view illustrating the Fresnel lens of FIG. 1.
Figure 3:
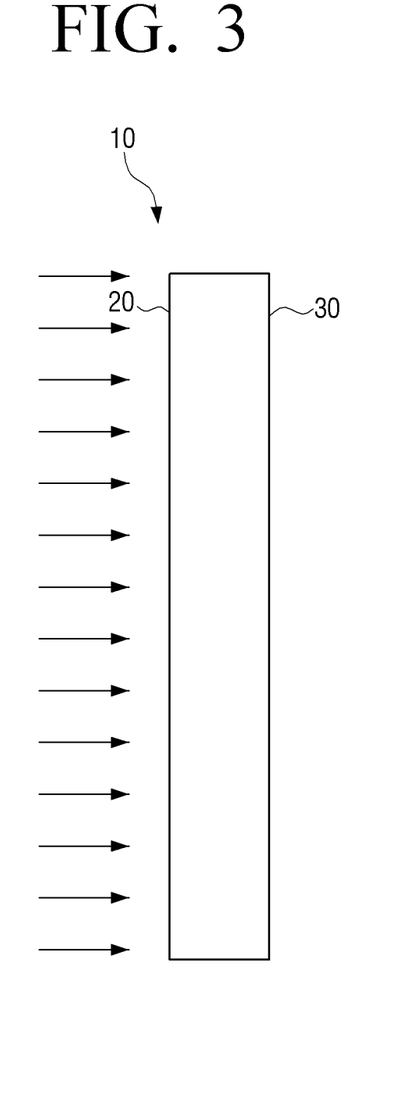
FIG. 3 is a side view illustrating the Fresnel lens of FIG. 1.

FIG. 1 is a perspective view illustrating a Fresnel lens according to an exemplary embodiment. FIG. 2 is a plan view illustrating the Fresnel lens of FIG. 1. FIG. 3 is a side view illustrating the Fresnel lens of FIG. 1.

Referring to FIGS. 1 to 3, a Fresnel lens 10 includes a plurality of unit lens groups 100, 200, 300, and 400 including a plurality of unit lenses.

The plurality of unit lens groups 100, 200, 300, and 400 includes a first unit lens group 100, a second unit lens group 200, a third unit lens group 300, and a fourth unit lens group 400. That is, the Fresnel lens 10 in the exemplary embodiment includes the plurality of unit lens groups 100, 200, 300 and 400, each having a different refractive index from each other. However, this is merely exemplary, and the number of unit lens groups may be four or more or at least two as long as there are unit lens groups having different refractive indexes.

Each of the first to fourth unit lens groups 100 to 400 may have a different refractive index and include a plurality of unit lenses. See also FIG. 4. The first unit lens group 100 may includes a plurality of unit lenses 100 having a refractive index different from those of the second to fourth unit lens groups 200, 300, and 400. Similarly, the second unit lens group 200 may include a plurality of unit lenses 200 having a refractive index different from those of the first, third, and fourth unit lens groups 100, 300, and 400. Similarly, the third unit lens group 300 may include a plurality of unit lenses 300 having a refractive index different from those of the first, second, and fourth unit lens groups 100, 200, and 400. Also, the fourth unit lens group 400 may include a plurality of unit lenses 400 having a refractive index different from those of the first, second, and third unit lens groups 100, 200, and 300.

Figure 4:
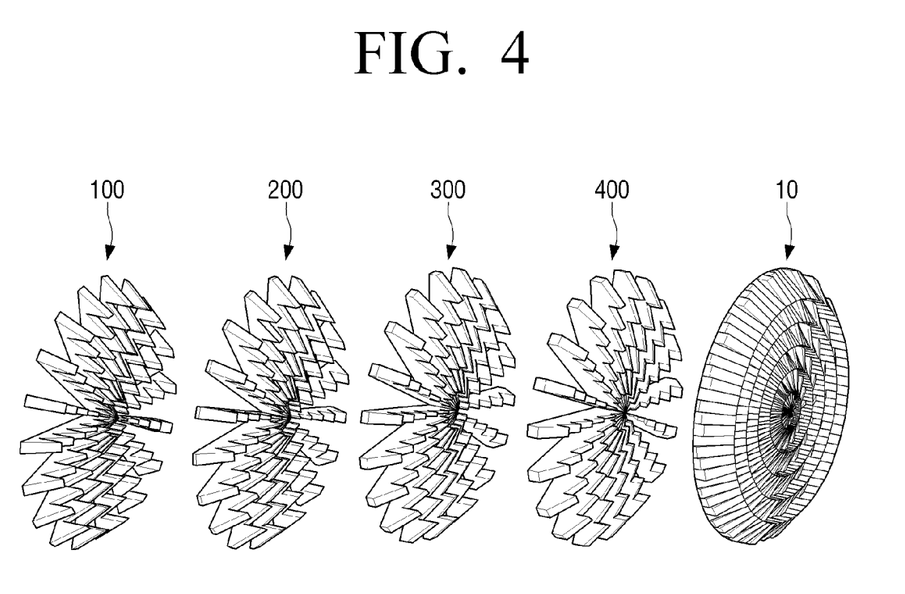
FIG. 4 is a view illustrating first to fourth unit lens groups of the Fresnel lens of FIG. 1.

The plurality of unit lenses 100 to 400 are arranged through a sequential repetitive arrangement of the unit lenses 100 to 400 having different refractive indexes. That is, the arrangement of unit lenses 100 to 400 of the Fresnel lens 10 may be accomplished through repetition of the sequential arrangement in order of one unit lens 100 of the first unit lens group 100, one unit lens 200 of the second unit lens group 200, one unit lens 300 of the third lens group 300, and one unit lens 400 of the fourth lens group 400. Here, the sequential arrangement of the unit lenses 100 to 400 may be made along a circumferential direction, and the circular Fresnel lens 10 is formed according to the sequential arrangement of the circumferential direction.

Each of the unit lenses 100 to 400 extends along a radial direction, and a width of each of the unit lenses 100 to 400 is gradually reduced from a circumference of the Fresnel lens toward the center of the Fresnel lens in the radial direction. See FIG. 2. When it is considered that a detecting sensor 3 shown in FIG. 7 reacts to an infrared ray having a wavelength of about 10 μm, an outermost width of each of the unit lenses 100 to 400 may be formed to be equal to or larger than about 20 μm to maintain lens characteristics.

As shown in Table 1, when a radius of the Fresnel lens 10 is 5 mm, 1571 unit lenses may be provided when the outermost width of each of the unit lenses 100 to 400 is 20 μm. At this time, when the Fresnel lens 10 includes the first to fourth unit lens groups 100 to 400 having four different refractive indexes as in the exemplary embodiment, 392 unit lenses having the same refractive index may be provided for each unit lens group 100 to 400. On the other hand, when 10 unit lens groups having different refractive indexes are applied to ensure a wider viewing angle, 157 unit lenses having the same refractive index may be provided for each unit lens group without a change in a total size of the Fresnel lens. Here, the outermost width of 20 μm is merely exemplary, and a Fresnel lens 10 may have a width of 20 μm or more for ease of processing.

TABLE 1

| Radius (mm) | Circumference (mm) | Circumference (μm) | Number of unit lenses in application of 20 μm |
|---|---|---|---|
| 1 | 6.28 | 6283.19 | 314 |
| 2 | 12.57 | 12566.37 | 628 |
| 3 | 18.85 | 18849.56 | 942 |
| 4 | 25.13 | 25132.74 | 1257 |
| 5 | 31.42 | 31415.93 | 1571 |
| 6 | 37.70 | 37699.11 | 1885 |
| 7 | 43.98 | 43982.30 | 2199 |
| 8 | 50.27 | 50265.48 | 2513 |
| 9 | 56.55 | 56548.67 | 2827 |
| 10 | 62.83 | 62831.85 | 3142 |

Figure 7:
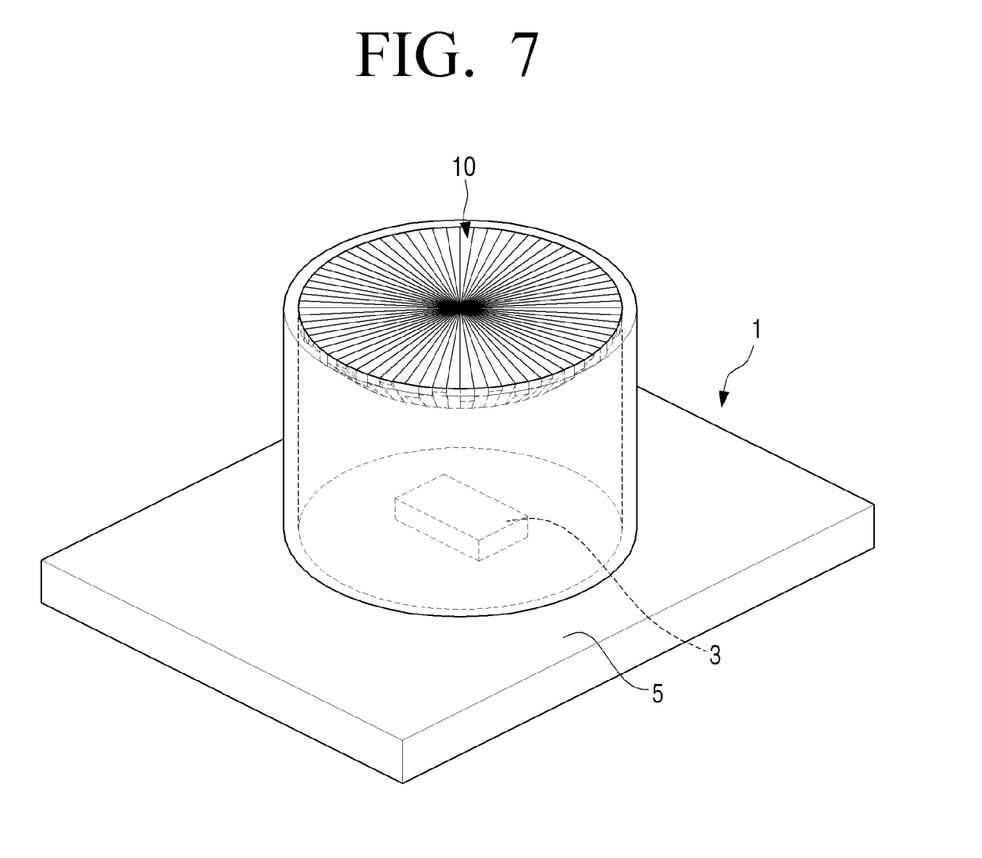
FIG. 7 is a perspective view illustrating a pyroelectricity sensor module according to an exemplary embodiment.

Referring to FIG. 3, the Fresnel lens 10 includes a light incident surface 20 to which infrared light is incident, and a light refracting surface 30 disposed opposite the light incident surface 20 and configured to concentrate the infrared light to a detecting sensor (see, e.g., detecting sensor 3 of FIG. 7). The light incident surface 20 and the light refracting surface 30 are formed through a combination of the first to fourth unit lens groups 100 to 400 illustrated in FIGS. 1 and 2.

Referring back to FIGS. 1 and 2, the light incident surface 20 may be formed to have circular shape. However, this is merely exemplary, and the light incident surface 20 may have a different polygonal shape such a triangle or a square etc. depending on the shapes of the unit lenses.

The light refracting surface 30 may include a plurality of light refraction portions 32, 34, 36, 37, 38, and 39. The plurality of light refraction portions 32, 34, 36, 37, 38, and 39 may include a first light refracting portion 32, a second light refracting portion 34, a third light refracting portion 36, a fourth light refracting portion 37, a fifth light refracting portion 38, and a sixth light refracting portion 39. In the exemplary embodiment, it is defined and described that six light refraction portions are formed.

The first to sixth light refraction portions 32, 34, 36, 37, 38 and 39 are sequentially arranged in a center direction from an outer circumference toward an inner part of the Fresnel lens 10 as shown in FIG. 2. Each of the first to sixth light refraction portions 32, 34, 36, 37, 38 and 39 refracts infrared light passing through the light incident surface 20 along four different refraction angles in the circumferential direction and concentrates the infrared toward the detecting sensor (see, e.g., the detecting sensor 3 of FIG. 7). Any one unit lens of the unit lens groups 100 to 400 may have the same refraction angle in the first to sixth light refraction portions 32, 34, 36, 37, 38, and 39. In other words, the plurality of unit lenses 100 in the first light refraction portion 32 may each have the same refraction angle, and the plurality of unit lenses 100 in the second light refraction portion 34 may each have the same refraction angle, and so on.

FIG. 4 is a view illustrating the first to fourth unit lens groups of the Fresnel lens of FIG. 1.

Referring to FIG. 4, the first to fourth unit lens groups 100 to 400 overlap each other in the same space to form one Fresnel lens 10. To the end, the unit lenses of the first unit lens group 100 are spaced at an interval along the circumferential direction so that the unit lenses of the second to fourth unit lens groups 200 to 400 are sequentially arranged. The unit lenses of the second unit lens group 200 are spaced at an interval along the circumferential direction so that one unit lens of the third unit lens group 300, one unit lens of the fourth unit lens group 400, and one unit lens of the first unit lens group 100 are sequentially arranged. The unit lenses of the third unit lens group 300 are spaced at an interval along the circumferential direction so that one unit lens of the fourth unit lens group 400, one unit lens of the first unit lens group 100, and one unit lens of the second unit lens group 200 are sequentially arranged. The unit lenses of the fourth unit lens group 400 are spaced at an interval along the circumferential direction so that the unit lenses of the first to third unit lens groups 100 to 300 are sequentially arranged. The intervals may be predetermined.

When the first to fourth unit lens groups 100 to 400 overlap, the unit lenses of the first to fourth unit lens groups 100 to 400 are in contact with adjacent unit lenses along the radial direction. Therefore, the first to fourth unit lens groups 100 to 400 form a single Fresnel lens 10.

As described above, the Fresnel lens 10 according to the exemplary embodiment may form a lens having different refraction angles from each other along the circumferential direction in a total lens through overlapping of the plurality of unit lens groups.

Therefore, the Fresnel lens 10 according to the exemplary embodiment may be implemented as a single Fresnel lens having different refraction angles from each other without an arrangement of individual Fresnel lenses having different refraction angles from each other, and thus a wide viewing angle can be ensured without allocating a space for additional Fresnel lenses.

Figure 5:
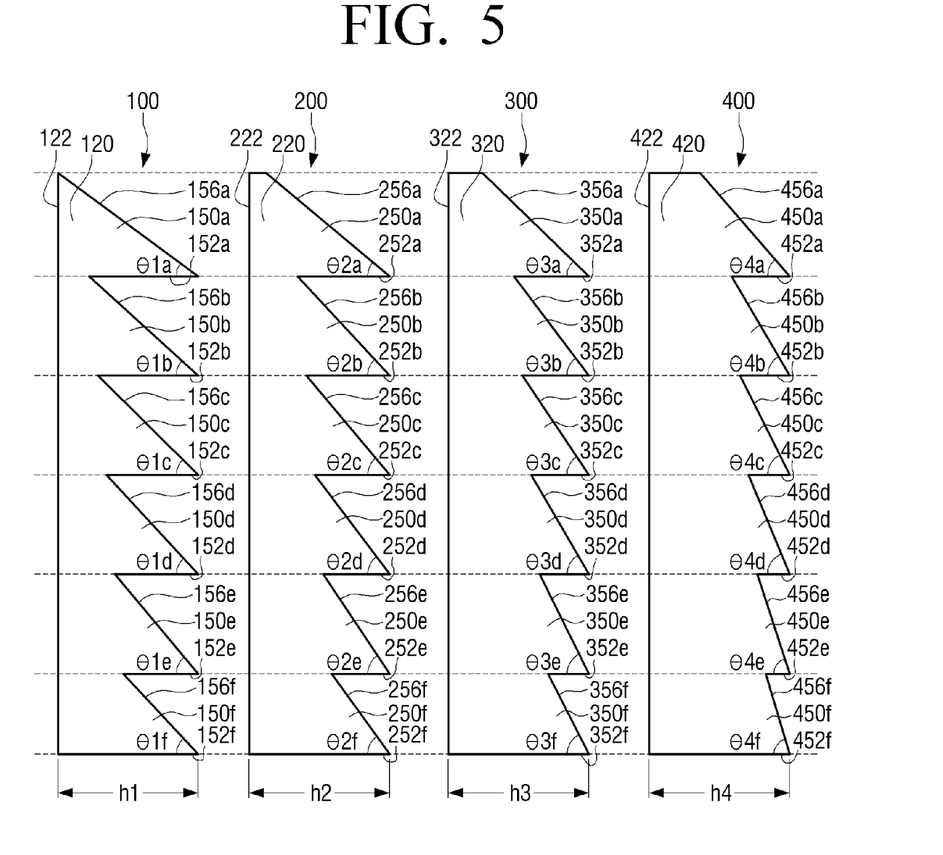
FIG. 5 is a view illustrating unit lenses of the first to fourth unit lens groups of the Fresnel lens of FIG. 4.

FIG. 5 is a view illustrating unit lenses of the first to fourth unit lens groups of FIG. 4.

Referring to FIG. 5, each unit lens 100 (hereinafter, referred to as 'a first unit lens') of the first unit lens group 100 includes a body portion 120 and a plurality of protrusion portions 150a, 150b, 150c, 150d, 150e and 150f. See also FIG. 4.

The body portion 120 of the first unit lens 100 forms a part of the light incident surface 20 (see FIG. 3) of the Fresnel lens 10 (see FIG. 3). A width of the body portion 120 of the first unit lens 100 is reduced toward the center of the Fresnel lens in the radial direction. Here, the body portion 120 of the first unit lens 100 is formed to have an outermost width of at least 20 μm in the radius direction as described above.

The plurality of protrusion portions 150a to 150f of the first unit lens 100 include a first protrusion portion 150a, a second protrusion portion 150b, a third protrusion portion 150c, a fourth protrusion portion 150d, a fifth protrusion portion 150e, and a sixth protrusion portion 150f. The first to sixth protrusion portions 150a to 150f of the first unit lens 100 extend from the body portion 120, and form part of the light refracting surface 30 of the Fresnel lens 10. Specifically, the first to sixth protrusion portions 150a to 150f of the first unit lens 100 form parts of the first to sixth light refraction portions 32, 34, 36, 37, 38 and 39, respectively. The first to sixth protrusion portions 150a to 150f of the first unit lens 100 are sequentially formed toward the center of the Fresnel lens 10 along the radial direction of the Fresnel lens 10.

The first to sixth protrusion portions 150a to 150f of the first unit lens 100 include respective extending portions 152a, 152b, 152c, 152d, 152e, and 152f extending from the body portion 120 of the first unit lens 100 and respective inclined portions 156a, 156b, 156c, 156d, 156e, and 156f obliquely extending from the extending portions 152a to 152f and connected to the body portion 120. Here, inclined angles θ1a, θ1b, θ1c, θ1d, θ1e, and θ1f between respective ones of the extending portions 152a to 152f and respective ones of the inclined portions 156a to 156f are formed to have the same refraction angle. That is, θ1a=θ1b=θ1c=θ1d=θ1e=θ1f.

A height h1 of the first unit lens 100 in the axial direction is formed to have the same height in all the first to sixth protrusion portions 150a to 150f of the first unit lens 100.

Each unit lens 200 (hereinafter, referred to as 'a second unit lens') of the second unit lens group 200 includes a body portion 220 and a plurality of protrusion portions 250a, 250b, 250c, 250d, 250e, and 250f.

The body portion 220 of the second unit lens 200 forms a part of the light incident surface 20 (see FIG. 3) of the Fresnel lens 10 (see FIG. 3). A width of the body portion 220 of the second unit lens 200 is reduced toward the center of the Fresnel lens 10 in the radial direction. Here, the body portion 220 of the second unit lens 200 is formed to have an outermost width of at least 20 μm in the radius direction as described above.

The plurality of protrusion portions 250a to 250f of the second unit lens 200 include a first protrusion portion 250a, a second protrusion portion 250b, a third protrusion portion 250c, a fourth protrusion portion 250d, a fifth protrusion portion 250e, and a sixth protrusion portion 250f. The first to sixth protrusion portions 250a to 250f of the second unit lens 200 extend from the body portion 220, and form part of the light refracting surface 30 of the Fresnel lens 10. Specifically, the first to sixth protrusion portions 250a to 250f of the second unit lens 200 form parts of the first to sixth light refraction portions 32, 34, 36, 37, 38 and 39, respectively. The first to sixth protrusion portions 250a to 250f of the second unit lens 200 are sequentially formed toward the center of the Fresnel lens 10 along the radial direction of the Fresnel lens 10.

The first to sixth protrusion portions 250a to 250f of the second unit lens 200 include respective extending portions 252a, 252b, 252c, 252d, 252e, and 252f extending from the body portion 220 of the second unit lens 200 and respective inclined portions 256a, 256b, 256c, 256d, 256e, and 256f obliquely extending from the extending portions 252a to 252f and connected to the body portion 220. Here, inclined angles θ2a, θ2b, θ2c, θ2d, θ2e, and θ2f between respective ones of the extending portions 252a to 252f and respective ones of the inclined portions 256a to 256f are formed to have the same refraction angle. That is, θ2a=θ2b=θ2c=θ2d=θ2e=θ2f.

A height h2 of the second unit lens 200 in the axial direction is formed to have the same height in all the first to sixth protrusion portions 250a to 250f of the second unit lens 200.

Each unit lens 300 (hereinafter, referred to as 'a third unit lens') of the third unit lens group 300 includes a body portion 320 and a plurality of protrusion portions 350a, 350b, 350c, 350d, 350e and 350f.

The body portion 320 of the third unit lens 300 forms a part of the light incident surface 20 (see FIG. 3) of the Fresnel lens 10 (see FIG. 3). A width of the body portion 320 of the third unit lens 300 is reduced toward the center of Fresnel lens 10 in the radial direction. Here, the body portion 320 of the third unit lens 300 is formed to have an outermost width of at least 20 µm in the radius direction as described above.

The plurality of protrusion portions 350a to 350f of the third unit lens 300 include a first protrusion portion 350a, a second protrusion portion 350b, a third protrusion portion 350c, a fourth protrusion portion 350d, a fifth protrusion portion 350e, and a sixth protrusion portion 350f. The first to sixth protrusion portions 350a to 350f of the third unit lens 300 extend from the body portion 320, and form a part of the light refracting surface 30 of the Fresnel lens 10. Specifically, the first to sixth protrusion portions 350a to 350f of the third unit lens 300 form parts of the first to sixth refraction portions 32, 34, 36, 37, 38 and 39, respectively. The first to sixth protrusion portions 350a to 350f of the third unit lens 300 are sequentially formed toward the center of the Fresnel lens 10 along the radial direction of the Fresnel lens 10.

The first to sixth protrusion portions 350a to 350f of the third unit lens 300 include respective extending portions 352a, 352b, 352c, 352d, 352e, and 352f extending from the body portion 320 of the third unit lens 300 and respective inclined portions 356a, 356b, 356c, 356d, 356e, and 356f obliquely extending from the extending portions 352a to 352f and connected to the body portion 320. Here, inclined angles θ3a, θ3b, θ3c, θ3d, θ3e, and θ3f between respective ones of the extending portions 352a to 352f and respective ones of the inclined portions 356a to 356f are formed to have the same refraction angle. That is, θ3a=θ3b=θ3c=θ3d=θ3e=θ3f.

A height h3 of the third unit lens 300 in the axial direction is formed to have the same height in all the first to sixth protrusion portions 350a to 350f of the third unit lens 300.

Each unit lens 400 (hereinafter, referred to as 'a fourth unit lens') of the fourth unit lens group 400 includes a body portion 420 and a plurality of protrusion portions 450a, 450b, 450c, 450d, 450e, and 450f.

The body portion 420 of the fourth unit lens 400 forms a part of the light incident surface 20 (see FIG. 3) of the Fresnel lens 10 (see FIG. 3). A width of the body portion 420 of the fourth unit lens 400 is reduced toward the center of the Fresnel lens 10 in the radial direction. Here, the body portion 420 of the fourth unit lens 400 is formed to have an outermost width of at least 20 µm in the radius direction as described above.

The plurality of protrusion portions 450a to 450f of the fourth unit lens 400 include a first protrusion portion 450a, a second protrusion portion 450b, a third protrusion portion 450c, a fourth protrusion portion 450d, a fifth protrusion portion 450e, and a sixth protrusion portion 450f. The first to sixth protrusion portions 450a to 450f of the fourth unit lens 400 extend from the body portion 420, and form a part of the light refracting surface 30 of the Fresnel lens 10. Specifically, the first to sixth protrusion portions 450a to 450f of the fourth unit lens 400 form parts of the first to sixth light refraction portions 32, 34, 36, 37, 38 and 39, respectively. The first to sixth protrusion portions 450a to 450f of the fourth unit lens 400 are sequentially formed toward the center of the Fresnel lens 10 along the radial direction of the Fresnel lens 10.

The first to sixth protrusion portions 450a to 450f of the fourth unit lens 400 include respective extending portions 452a, 452b, 452c, 452d, 452e, and 452f extending from the body portion 420 of the fourth unit lens 400 and respective inclined portions 456a, 456b, 456c, 456d, 456e, and 456f obliquely extending from the extending portions 452a to 452f and connected to the body portion 420. Here, inclined angles θ4a, θ4b, θ4c, θ4d, θ4e, and θ4f between respective ones of the extending portions 452a to 452f and respective ones of the inclined portions 456a to 456f are formed to have the same refraction angle. That is, θ4a=θ4b=θ4c=θ4d=θ4e=θ4f.

A height h4 of the fourth unit lens 400 in the axial direction is formed to have the same height in all the first to sixth protrusion portions 450a to 450f of the fourth unit lens 400. Here, the heights h1 to h4 of the first to fourth unit lenses 100 to 400 may be formed to be equal to each other. Therefore, the first to sixth light refraction portions (see 32, 34, 36, 37, 38, and 39 of FIG. 1) may have the same height.

The first protrusion portion 150a of the first unit lens 100, the first protrusion portion 250a of the second unit lens 200, the first protrusion portion 350a of the third unit lens 300, and the first protrusion portion 450a of the fourth unit lens 400 form part of the first light refraction portion 32 (see FIG. 1).

The second protrusion portion 150b of the first unit lens 100, the second protrusion portion 250b of the second unit lens 200, the second protrusion portion 350b of the third unit lens 300, and the second protrusion portion 450b of the fourth unit lens 400 form part of the second light refraction portion 34 (see FIG. 1).

The third protrusion portion 150c of the first unit lens 100, the third protrusion portion 250c of the second unit lens 200, the third protrusion portion 350c of the third unit lens 300, and the third protrusion portion 450c of the fourth unit lens 400 form part of the third light refraction portion 36 (see FIG. 1).

The fourth protrusion portion 150d of the first unit lens 100, the fourth protrusion portion 250d of the second unit lens 200, the fourth protrusion portion 350d of the third unit lens 300, and the fourth protrusion portion 450d of the fourth unit lens 400 form part of the fourth light refraction portion 37 (see FIG. 1).

The fifth protrusion portion 150e of the first unit lens 100, the fifth protrusion portion 250e of the second unit lens 200, the fifth protrusion portion 350e of the third unit lens 300, and the fifth protrusion portion 450e of the fourth unit lens form part of the fifth light refraction portion 38 (see FIG. 1).

The sixth protrusion portion 150f of the first unit lens 100, the sixth protrusion portion 250f of the second unit lens 200, the sixth protrusion portion 350f of the third unit lens 300, and the sixth protrusion portion 450f of the fourth unit lens 400 form part of the sixth light refraction portion 39 (see FIG. 1).

Therefore, the protrusion portions of the first to fourth unit lens 100 to 400 having the different refraction angles from each other are sequentially arranged in the first to sixth light refraction portions 32, 34, 36, 37, 38, and 39 (see FIG. 1). That is, $\theta 1a \neq \theta 2a \neq \theta 3a \theta 4a$.

Figure 6:
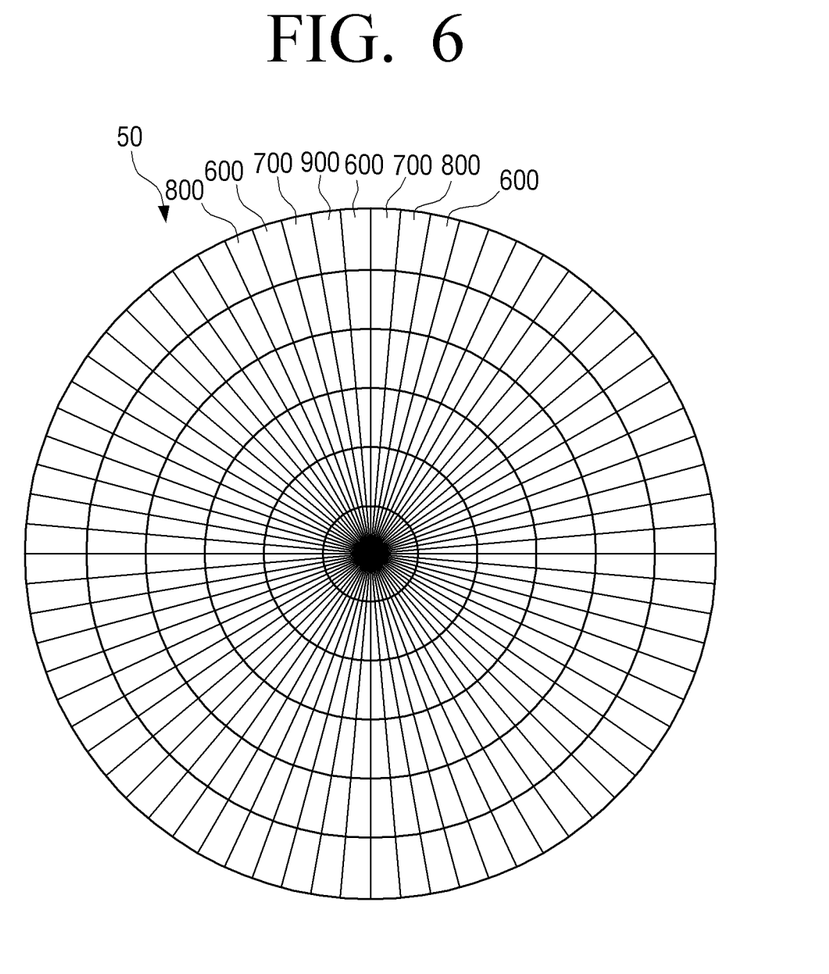
FIG. 6 is a plan view illustrating a Fresnel lens according to another exemplary embodiment.

FIG. 6 is a plan view illustrating a Fresnel lens according to another exemplary embodiment.

Referring to FIG. 6, a Fresnel lens 50 includes a first unit lens group 600, a second unit lens group 700, a third unit lens group 800, and a fourth unit lens group 900. The first to fourth unit lens groups 600, 700, 800, and 900 may have different refraction indexes from each other.

Hereinafter, the Fresnel lens 50 of the exemplary embodiment will be described by focusing on differences from the Fresnel lens 10 of the above-described exemplary embodiment.

In the Fresnel lens 50 of the exemplary embodiment, the unit lenses of the first to fourth unit lens groups 600 to 900 having different refractive indexes are irregularly arranged. Thus, at least one unit lens included in a different unit lens group is arranged between two unit lenses of the same lens group in a circumferential direction of the Fresnel lens 50.

For example, as illustrated in FIG. 6, on the basis of a unit lens 900 of the fourth unit lens group 900 located at 12 o'clock direction, one unit lens 600 of the first unit lens group 600 and one unit lens 700 of the second unit lens group 700 may be arranged to the right of the unit lens 900 in a clockwise direction, and one unit lens 700 of the second unit lens group 700 and one unit lens 600 of the first unit lens group 600 may be arranged to the left of the unit lens 900 in a counterclockwise direction.

As the above, in the first to fourth unit lens groups 600 to 900, when at least one unit lens of different unit lens groups is arranged between two unit lenses of the same unit lens group, the unit lenses of the first to fourth unit lens groups 600 to 900 are not sequentially arranged as in the exemplary embodiment shown in FIG. 1.

FIG. 7 is a perspective view illustrating a pyroelectricity sensor module according to an exemplary embodiment.

Referring to FIG. 7, a pyroelectricity sensor module 1 includes the detecting sensor 3, a signal processing board 5, and a Fresnel lens 10.

The detecting sensor 3 is disposed in a rear of the Fresnel lens 10 and detects infrared light concentrated from the Fresnel lens 10. The detecting sensor 3 may be a pyroelectric infrared ray (PIR) sensor. The PIR sensor is a pyroelectric device sensor configured to react to an infrared ray having a wavelength of about 10 μm emitted from a human body, and may be formed using a lead zirconate titanate (PZT)-based material and a lithium tantalite (LiTaO$_3$)-based material. Basically, in the PIR sensor, the surface is always charged through spontaneous polarization, but the surface is neutralized by ions in air in a thermal equilibrium state, and thus output is not generated. At this time, when infrared light emitted from a human body is incident to the PIR sensor, a temperature near a surface of the PIR sensor is increased, and thus the equilibrium state is broken. This is referred to a pyroelectricity effect, and the PIR sensor may detect a human body through the pyroelectricity effect.

The detecting sensor 3 is mounted on the signal processing board 5, and the signal processing board 5 controls an output signal of the detecting sensor 3. Specifically, the signal processing board 5 may amplify the output signal of the detecting sensor 3. The Fresnel lens 10 according to the exemplary embodiment has various refraction angles and does not increase in a size thereof. Therefore, an amount of the infrared ray incident to the Fresnel lens 10 may be reduced as compared to the related art, and thus an effective operation distance of the detecting sensor 3 may be also reduced. At this time, the signal processing board 5 may amplify the output signal of the detecting sensor 3 to compensate for a reduction in amount of the infrared rays incident to the Fresnel lens 10.

Like the above-described exemplary embodiment, the Fresnel lens 10 has different refraction angles and is configured of a single circular lens. Therefore, the Fresnel lens 10 may be miniaturized, and thus the pyroelectricity sensor module 1 may be also miniaturized.

As the Fresnel lens mounted on the pyroelectricity sensor module 1, the Fresnel lens 50 in FIG. 6 may alternatively be provided, and a lens having a polygonal shape such as a triangle or a square may alternatively be provided.

The foregoing exemplary embodiments and advantages are merely exemplary and are not to be construed as limiting the present inventive concept. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A Fresnel lens comprising:
   a plurality of unit lens groups having different refractive indexes, each of the plurality of unit lens groups including a plurality of unit lenses, the plurality of unit lenses in each unit lens group having same refractive indexes,
   wherein between two unit lenses of a same unit lens group, at least one unit lens included in a different lens group is arranged.

2. The Fresnel lens as claimed in claim 1, wherein an arrangement of the plurality of unit lenses is made through repetition of a sequential arrangement of the unit lenses having different refractive indexes.

3. The Fresnel lens as claimed in claim 1, wherein an arrangement of the plurality of unit lenses is made through an irregular arrangement of the unit lenses having different refractive indexes.

4. The Fresnel lens as claimed in claim 1, wherein the plurality of unit lenses extend along a radial direction.

5. The Fresnel lens as claimed in claim 4, wherein each of the unit lenses includes:
   a body portion configured to form a light incident surface of the Fresnel lens; and
   a plurality of protrusion portions extending from the body portion and configured to form a light refracting surface of the Fresnel lens.

6. The Fresnel lens as claimed in claim 5, wherein each of the plurality of protrusion portions includes:
an extending portion extending from the body portion; and
an inclined portion obliquely extending from the extending portion and connected to the body portion.

7. The Fresnel lens as claimed in claim 5, wherein the light incident surface has a circular shape or a polygonal shape.

8. The Fresnel lens as claimed in claim 5, wherein the plurality of protrusion portions include a first protrusion portion, a second protrusion portion, a third protrusion portion, a fourth protrusion portion, a fifth protrusion portion, and a sixth protrusion portion.

9. The Fresnel lens as claimed in claim 8, wherein the first to sixth protrusion portions of the plurality of the unit lenses form first to sixth light refraction portions of the Fresnel lens, respectively.

10. The Fresnel lens as claimed in claim 5, wherein a width of the body portion is gradually reduced from the circumference of the Fresnel lens toward the center of the Fresnel lens in the radial direction.

11. The Fresnel lens as claimed in claim 10, wherein the width of the body portion at the circumference of the Fresnel lens is at least 20 μm.

12. The Fresnel lens as claimed in claim 4, wherein each of the unit lenses is in contact along the radial direction with adjacent unit lenses.

13. The Fresnel lens as claimed in claim 1, wherein the plurality of unit lens groups include a first unit lens group, a second unit lens group, a third unit lens group, and a fourth unit lens group.

14. The Fresnel lens as claimed in claim 1, wherein the plurality of unit lenses are arranged along a circumferential direction of the Fresnel lens, and
wherein the at least one unit lens included in the different lens group is arranged between the two unit lenses of the same unit lens group in the circumferential direction.

15. A pyroelectricity sensor module comprising:
a Fresnel lens including a plurality of unit lenses, the Fresnel lens configured to condense infrared light;
a detecting sensor disposed to receive the infrared light condensed by the Fresnel lens and configured to detect the infrared light; and
a signal processing board on which the detecting sensor is mounted and configured to control an output signal of the detecting sensor,
wherein the Fresnel lens includes a plurality of unit lens groups having different refractive indexes, and each of the plurality of unit lens groups includes a plurality of unit lenses, and the plurality of unit lenses in each unit lens group having same refractive indexes, and
wherein between two unit lenses of a same unit lens group, at least one unit lens included in a different lens group is arranged.

16. The pyroelectricity sensor module as claimed in claim 15, wherein an arrangement of the plurality of unit lenses is made through repetition of a sequential arrangement of the unit lenses having different refractive indexes.

17. The pyroelectricity sensor module as claimed in claim 14, wherein an arrangement of the plurality of unit lenses is made through an irregular arrangement of the unit lenses having different refractive indexes.

18. The pyroelectricity sensor module as claimed in claim 15, wherein the signal processing board is configured to amplify the output signal of the detecting sensor.

19. The pyroelectricity sensor module as claimed in claim 15, wherein the detecting sensor is a pyroelectric infrared ray (PIR) sensor.

20. The pyroelectricity sensor module as claimed in claim 15, wherein the plurality of unit lenses are arranged along a circumferential direction of the Fresnel lens, and
wherein the at least one unit lens included in the different lens group is arranged between the two unit lenses of the same unit lens group in the circumferential direction.

* * * * *